United States Patent Office 3,792,005
Patented Feb. 12, 1974

3,792,005
LOW MOLECULAR WEIGHT BLOCK COPOLYMERS AND COATING COMPOSITIONS THEREOF
James T. Harlan, Jr., Torrance, Calif., assignor to Shell Oil Company
No Drawing. Filed Feb. 7, 1972, Ser. No. 224,315
Int. Cl. C08c *11/22;* C08d *9/12;* C08f *19/08*
U.S. Cl. 260—27 BB    9 Claims

ABSTRACT OF THE DISCLOSURE

Block copolymers having unexpectedly high tensile strength and low solution viscosity comprise polymers having at least one hydrogenated conjugated diene polymer block having an average molecular weight between 18,000 and 35,000, and at least two monoalkenyl arene polymer blocks having an average molecular weight between 4,000 and 7,500. Coating compositions thereof comprise the above polymers dispersed in a solvent carrier having a Hildebrand solubility parameter between about 7.5 and 9.2 (cal./cm.$^3$)$^{1/2}$.

---

Block copolymers of conjugated dienes and monoalkenyl arenes have been studied in substantial detail together with certain hydrogenated derivatives thereof. Hydrogenation of this general class of block copolymers is disclosed in Canadian Pat. No. 815,575 and U.S. Pat. 3,595,942. These patents suggest that the block copolymers may be selectively or completely hydrogenated and that the monoalkenyl arene blocks should have molecular weights within the range from about 8,000 to 60,000. The conjugated diene blocks taught in the patent have molecular weights in the order of 50,000–300,000. No discussion of the microstructure of the latter type of blocks is given and no reference is made to coating compositions. The block copolymers which are referred to are useful for many purposes but, having the substantial total molecular weights inherent in these block dimensions, they are not very suitable for coating purposes. This is because they exhibit rapidly increasing solution viscosity wth increasing concentration and it is not possible to prepare coatings therefrom of adequate thickness without a multiple series of applications.

U.S. Pat. 3,431,323 is the basic patent on hydrogenated polymers wherein, prior to hydrogenation, the diene block is polybutadiene having a 1,2-content between about 15 and 70%. The molecular weights of the vinyl arene blocks vary from 4,000 to 115,000 while those of the diene blocks may vary from 20,000 to 450,000. Essentially all of the disclosure in this patent is directed to completely saturated block copolymers.

Another patent concerned with completely saturated polymers of this type is U.S. 3,333,024. This describes completely saturated polymers of the same general type as the previous patent, but no reference is made to microstructure nor to use of the polymers in coatings.

A further U.S. patent, 3,239,478 refers to block polymers of this general type combined with oils and resins to form adhesives. No discussion is present concerning microstructure or coatings. Finally, South African Pat. 70/3,528 describes hydrogenated styrene-butadiene polymers said to be useful as oil pour point depressants. The effect of vinyl content upon pour point depressant is discussed but no coating compositions are disclosed.

It is essential for coating compositions to be so compounded that they may be applied at minimum cost. They must be stable to oxidation and capable of being applied by already established coating procedures. The above patents do not suggest polymers which are suitable for this purpose nor do they suggest low molecular weight polymers which would have low solution viscosity and at the same time high tensile strength.

It is an object of the present invention to provide a novel class of selectively hydrogenated block copolymers. It is a particular object of the invention to provide such copolymers having unpredicted high tensile strength in combination with low solution viscosity. It is a further object of the invention to provide coating compositions made therefrom. Other objects will become apparent during the following detailed description of the invention.

Now, in accordance with the present invention, a novel class of block copolymers meeting the above requirements comprises a block copolymer having at least one hydrogenated $C_{4-5}$ conjugated diene polymer block B, said block having an average molecular weight between about 18,000 and 35,000 and at least two monoalkenyl arene polymer blocks A; said blocks each having an average molecular weight between about 4,000 and 7,500. Coating compositions having surprisingly low viscosities may be prepared from these block copolymers when the solvent employed has a solubility parameter between about 7.5 and 9.2 (cal./cm.$^3$)$^{1/2}$.

One of the unexpected features of the present invention lies in the unpredicted combination of high tensile strength and low solution viscosity as well as low melt viscosity of the above described class of selectively hydrogenated block copolymers. The term "hydrogenated conjugated diene polymer block" is meant to include not only polymer blocks obtained by polymerizing dienes and subsequently hydrogenating them but also their essential equivalent, namely, copolymer blocks prepared by polymerizing alpha olefins to form amorphous polymers. In the latter case, of course, the pendant $C_{2-3}$ alkyl groups are present in an amount such that they fall within the range of pendant groups specified above.

The conjugated dienes which may be utilized include especially butadiene and isoprene as well as mixtures thereof.

The butadiene block microstructure required in accordance with the present invention is expressed as the percent of 1,2-units present in the diene polymer block prior to hydrogenation. Butadiene is polymerized to form 35–70% of its units in the 1,2-configuration, i.e. 17.5–35% of the total butadiene carbon atoms are present as pendant vinyl groups. Isoprene, on the other hand, forms polymer blocks having sufficient pendant methyl groups that its precise microstructure is not of major importance relative to the present invention.

The microstructure is achieved in a controlled manner during polymerization such as by the presence of a polar material including ethers, thioethers or tertiary amines which are present during polymerization especially when an alkyl lithium initiator is employed for the polymerization.

The mono alkenyl arenes including styrene, ring alkylated styrenes and styrene derivatives substituted in the vinyl group such as alpha methyl styrene. The precise structure of the block copolymer may be either linear or radial, etc., as long as the total average molecular weight of the entire block polymer is less than about 100,000. If the structure is linear it is preferred that the total average molecular weight be less than about 70,000. Basically, the preferred structure is A—B—A which represents the structure basically defined hereinabove.

Means for preparing the block copolymers are known especially as described in such patents as U.S. 3,265,765, U.S. 3,431,323 and other issued patents directed to various aspects of polymerization to produce either linear or branched polymer chains. Usually, linear polymers result from sequential block polymerization of the individual monomers or by combination of sequential polymerization and coupling with the use of difunctional coupling agents. Branched structures result from a combination of sequential block polymerization and multifunctional coupling agents such as silicon tetrachloride or diesters of a monohydric alcohol and a dicarboxylic acid including diethyl adipate. The branched block copolymers have been found to have relatively lower solution viscosity and melt viscosity than the linear polymers of the same total molecular weight.

The individual blocks may be either homopolymer blocks or copolymer blocks. Blocks A may be identical or independently selected and should comprise at least 80% by weight of monoalkenyl arene, any balance being conjugated diene. The blocks B comprise at least about 80% conjugated diene, any balance being monoalkenyl arene. Mixtures of the two classes of polymerizable monomers in the individual blocks also are intended to be included within the language of the claims and specification. Thus, where reference is made to monoalkenyl arene polymer blocks these may be homopolymer blocks, for example, polystyrene or copolymer blocks of styrene and alpha methyl styrene.

Preferably, blocks A have an average molecular weight between about 4,500 and 6,500 and blocks B have an average molecular weight between about 20,000 and 32,000. If the block B comprises polybutadiene, prior to hydrogenation, it should have a 1,2-content preferably between about 38 and 60%. Moreover, blocks A should comprise less than about 50% by weight of the block polymer and preferably less than about 40% by weight thereof. Subsequent to preparation of the precursor block copolymer by block polymerization of the described monomers, the products are subjected to selective hydrogenation such as by the process outlined in U.S. Pat. 3,595,942. Conditions are employed for the hydrogenation such that at least 90% of the aliphatic unsaturation is reduced while no more than about 20% of the aromatic unsaturation is reduced. It has been found in accordance with the present invention that if the entire block copolymer is completely hydrogenated than the products are unsuitable for the purposes referred to above due apparently to the increased compatibility between the completely hydrogenated monovinyl arene polymer blocks and the completely hydrogenated conjugated diene polymer blocks when the molecular weights are within the relatively low ranges referred to above. The molecular weights expressed throughout the specification and claims are number average molecular weights preferably obtained by tritium counting, osmotic pressure or gel permeation chromatography methods. The claims as they are drawn and the specification as well will be interpreted to include not only completely hydrogenated conjugated diene blocks and completely non-hydrogenated monoalkenyl arene blocks but also blocks having the limitations just described.

The preferred structure, prior to hydrogenation, is polystyrene-polybutadiene-polystyrene having the above preferred molecular weight. These block copolymers are useful especially where low solution viscosity or low melt viscosity are highly desirable such as in coating compositions, certain adhesives and caulking compounds. They may be blended with other carefully selected coating or adhesive components. The utility especially contemplated is in coating compositions. The objective in this invention was to discover and utilize a class of highly stable block copolymers having both high tensile strength and, most especially, relatively low solution viscosity. These objectives were achieved by not only restricting the block molecular weight as described above but also by restricting the microstructure of the precursor polymers as well as by utilizing a solvent or a mixture of solvents compatible with the two types of polymer blocks to such an extent that minimum solution viscosities are obtained, thus making it possible therefore to compound coating compositions from 5–60% by weight of solids. Preferably, the solids content relative to the block copolymer is in the order of 10–50% by weight.

The solvents especially useful in the coating compositions of this invention have solubility parameters between about 7.5 and 9.2, preferably between about 8.0 and 9.0 (cal./cm.$^3$)$^{1/2}$. Typical solvents falling within the scope of the present invention are the following:

| | Hildebrand solubility parameter (ca./cm.$^3$)$^{1/2}$ |
|---|---|
| Benzene | 9.2 |
| Trichloroethylene | 9.2 |
| Carbon tetrachloride | 8.6 |
| 1,1,1-trichloroethane | 8.5 |
| Cyclohexane | 8.2 |
| 2,2-dichloropropane | 8.2 |
| Ethylamylketone | 8.2 |
| Dipentene | 8.5 |
| Ethylbenzene | 8.8 |
| Methyl cyclohexane | 7.8 |
| Toluene | 8.9 |
| Xylene | 8.8 |

Hydrocarbon solvents are especially preferred. Single solvents may be utilized but certain pairs of solvents have been found to result in unexpectedly low solution viscosity. When pairs of solvents are employed, the limitation is that the average solubility parameter should fall within the range given above. The use of multicomponent solvent mixtures with a balance of solution viscosity, volatility, residual solvents, characteristics, etc., is probably optimum, using art known in the coatings field. It is preferred that if binary solvent systems are utilized one of the solvents should have a solubility parameter closely matching that of one of the polymer block types while the other solvent should have a solubility parameter closely matching that of the second polymer block type. By "closely matching" is meant a solvent having a solubility parameter within about 0.5 units of that of the polymer block species. The solubility parameters are expressed in terms of Hildebrand units which are the square root of calories per cubic centimeter of the solvent. A discussion of suitable solvents and solubility parameter may be found in the Journal of Paint Technology, vol. 38, May 1966, page 269 et seq. and in the Encyclopedia of Polymer Science and Technology, vol. 13, p. 833 et sq., Interscience Publishers, N.Y. (1965). Suitable pairs of solvents comprise mixtures of cyclohexane and benzene or methyl cyclohexane and toluene. The solubility parameter of the hydrogenated diene blocks is about 7.9–8.5, while that of the vinyl arene blocks is about 8.9–9.2.

Coatings of two special types are provided according to the present invention, namely, strippable coatings and permanent coatings.

Strippable coatings preferably have the following composition, the polymer being the block copoymer of this invention.

| | Parts by weight |
|---|---|
| Polymer | 100 |
| Filler | 50–200 |
| Incompatible resin | 5–30 |
| Resin curing agent | 0–1 |
| Plasticizer | 0–50 |
| Solvent | 0–1500 |

The fillers are those well-known in the art, namely, clays, talc, calcium carbonate, etc. The plasticizers are rubber extending mineral oils or olefin oligomers such as polypropenes or polybutenes. The solvents are those discussed hereinbefore. By "incompatible resin" is meant a resin that is largely incompatible with both types of polymer blocks in the block copolymer; these include, for example, phenolic resins such as alkyl phenolics, certain terpene phenolics and non-reactive phenol-formaldehyde resins. Curing agents for some of these resins may be added, such as magnesium oxide.

Permanent coatings preferably have the following composition, the polymer being the block copolymer of this invention:

|  | Parts by weight |
|---|---|
| Polymer | 100 |
| Filler | 25–150 |
| Tackifying resin | 25–100 |
| Plasticizer | 0–50 |
| Solvent | 0–1500 |

The fillers, plasticizers and solvents are defined above. The tackifying resins are those which associate (i.e. are compatible with) the hydrogenated diene polymer block and exhibit no more than a minor degree of association with the vinyl arene polymer blocks. They include, for example, copolymers of 40–80 wt. percent 1,3-pentadiene and 60–20 wt. percent 2-methyl-2-butene, pentaerythritol esters of rosin, alpha-pinene resins, polyterpene phenolics and olefinic resins.

The following working examples illustrate the preparation and hydrogenation of block polymers falling within the scope of the present invention. They also show the solution properties of such copolymers as well as the properties of the block copolymer compounded to form a strippable coating.

EXAMPLE I.—PREPARATION AND HYDROGENATION OF A BLOCK COPOLYMER OF THIS INVENTION

Precursor

Three segments prepared in sequence:

Step I.—Polystyrene: Solution of styrene monomer in cyclohexane solvent was charged to the polymerization reactor. Residual reactive impurities were scavenged by titration with sec-butyllithium. Upon reaching incipient initiation of monomer or end-point of titration, the predetermined quantity of sec-butyllithium was added for initiation. The polymerization was carried out anaeobically under inert gas pressure at temperatures ranging from 30 to 50° C.

Step II.—Polybutadiene: A solution of butadiene monomer in cyclohexane-ether solvent was charged to a reactor. The quantity of ether (8% w.) was sufficient to modify the polybutadiene microstructure to obtain a 1,2-content of 40–50%. The solution was scavenged as described above. Upon attaining the titration end-point, the active Step I polymer solution was added to initiate the butadiene monomer. The polymerization was performed at temperatures ranging from 15° to 60° C.

Step III.—Polystyrene: A solution of styrene monomer in cyclohexane solvent was charged to a reactor and subsequently scavenged as described above. Upon attaining the titration end-point, the entire scavenged solution was transferred to the reactor containing the active two-block polymer solution made in Step II. The active polymer then initiated the styrene monomer to form the third segment. The polymerization was performed at temperatures ranging from 45 to 60° C., the final polymer comprised about 16% w. of the reaction mixture. The active three-block polymer was terminated with an agent such as methanol. Antioxidant was also added to provide protection from degradation during polymer storage.

| Polybutadiene microstructure: | Percent |
|---|---|
| 1,2 | 46.4 |
| Cis-1,4 | 21.0 |
| Trans-1,4 | 32.6 |

POLYMERIZATION QUANTITIES

|  | Step I | Step II | Step III | Termination |
|---|---|---|---|---|
| Styrene, lbs | 39.0 |  | 39.0 |  |
| Butadiene, lbs |  | 200 |  |  |
| s-Butyllithium | (¹) |  |  |  |
| Cyclohexane, lbs | 351 | 884 | 133 |  |
| Diethyl ether, lbs |  | 134 |  |  |
| Methanol, ml |  |  |  | 110 |
| Oxidation inhibitor, lbs |  |  |  | 0.28 |

¹ 2,646 ml. of 8% w./v. or 3.31 moles or 0.468 lb. s-BuLi.

Hydrogenation

The catalyst for hydrogenation was prepared by adding 65.65 ml. of a 29.2% w. dried* solution of nickel octoate in cyclohexane and 83.8 ml. of a 14.6% w. solution of triethyl aluminum in cyclohexane to 1.6 lbs. of cyclohexane in a stirred reaction vessel under anaerobic conditions. The reaction exotherm raised the temperature from −25° C. to 30° C. The contents were then heated to 40° C. and maintained at that temperature for one-half hour.

For the hydrogenation, 62.5 lbs. of the 15.6% polymer cement from the polymerization reaction and 61.5 lbs. of cyclohexane were added to the hydrogenation reactor, together with 18.1 ml. isopropanol in 100 ml. of cyclohexane. Then the catalyst from the preceding preparation was added. Hydrogen was added and the contents were heated to 70° C. (partly by exotherm) and maintained at that temperature for four hours under 1100 p.s.i.g. hydrogen pressure. At the end of the hydrogenation, 0.5% w. of methanol was added, together with 0.1 phr. Oxidation Inhibitor.

The cement was treated with hydrochloric acid/methanol (∼1% commercial hydrochloric acid, 5% methanol, and the remainder water), phase separated and washed to remove catalyst residues and coagulated by ejecting steam with the cement into hot water (Rundquist— Recovery of Polymers U.S. 3,050,113) and the resultant crumb dried in a hot air oven at 190° F.

EXAMPLE II.—SOLUTION PROPERTIES OF THE BLOCK COPOLYMER

The viscosity of the block copolymer prepared according to Example I was determined in toluene at several concentrations. Determinations were made in a Brookfield small sample viscometer at 25° C. The results obtained are given in the following table:

| Concentration, wt. percent polymer: | Viscosity cp. at 25° C. |
|---|---|
| 15.0 | 55 |
| 25.6 | 595 |
| 30.1 | 1580 |

EXAMPLE III.—PROPERTIES OF A COMPOUNDED BLOCK COPOLYMER OF THIS INVENTION

The block copolymer prepared as described in Example I was compounded in a strippable coating formulation as follows:

|  | Parts by weight |
|---|---|
| Block copolymer | 100 |
| Talc | 90 |
| Heat reactive phenolic resin | 10 |
| MgO | 0.2 |
| Stabilizers | 0.6 |
| Toluene | (¹) |

¹ To give 20% concentration of total solids.

Films (0.01–0.02 inch thickness) of the formulation were cast on aluminum plates, air dried, stripped off the plates and annealed at 40° C. for 2 hours, then tested in an Instron tester at a jaw separation speed of 10 in per minute. The data obtained are given below. For comparison data are also shown for an unsaturated block

* Dried by distilling off cyclohexane/water azeotrope and replacing with dry cyclohexane.

copolymer having the structure polystyrene-polybutadiene-polystyrene with block molecular weights of 14,000–64,000–14,000 having a 1,2-content of about 10% in the polybutadiene block.

|  | Polymer of the invention | Comparative polymer |
|---|---|---|
| 300% modulus, p.s.i. | 1,750 | 1,425 |
| Tensile strength at break, p.s.i. | 1,970 | 1,900 |
| Elongation at break, percent | 337 | 547 |

I claim as my invention:

1. A block copolymer having at least two monoalkenyl arene polymer blocks A, each having an average molecular weight between about 4,000 and 7,500, no more than about 20% of the aromatic unsaturation in said block having been reduced; and at least one hydrogenated homopolymeric block B of a conjugated diene having 4–5 carbon atoms per monomer unit, at least 90% of the aliphatic unsaturation in said block having been reduced, 35–70% of said units in the polymer block, prior to hydrogenation, being 1,2-units if block B is a polybutadiene block, each block B having an average molecular weight between about 18,000 and 35,000.

2. A block copolymer according to claim 1 wherein the block copolymer, prior to hydrogenation, has the structure polystyrene-polybutadiene-polystyrene, the polystyrene blocks having an average molecular weight of 4,500–6,500 and the polybutadiene block having an average molecular weight of 20,000–32,000 and a 1,2-content of 38–60%, blocks A comprising less than 50% by weight of the copolymer.

3. A composition comprising:
   (a) 5–60% by weight of a block copolymer according to claim 1; and
   (b) a solvent carrier therefor having a solubility parameter between about 7.5 and 9.2 (cal./cm.$^3$)$^{1/2}$.

4. A composition according to claim 3 wherein polymer blocks A comprise at least about 80% by weight of styrene units.

5. A composition according to claim 3 wherein polymer blocks B comprise at least about 80% hydrogenated polybutadiene units.

6. A composition according to claim 3 wherein polymer blocks A have an average molecular weight between about 4,500 and 6,500 and polymer blocks B have an average molecular weight between about 20,000 and 32,000 blocks A comprising less than about 50% by weight of the block copolymer.

7. A composition according to claim 3 wherein the block copolymer, prior to hydrogenation, has the structure polystyrene-polybutadiene-polystyrene, the polystyrene blocks having an average molecular weight of 4,500–6,500 and the polybutadiene block having an average molecular weight of 20,000–32,000 and a 1,2-content of 38–60%, the blocks A comprising less than 50% by weight of the copolymer.

8. A coating composition comprising:

|  | Parts by weight |
|---|---|
| (a) Polymer according to claim 1 | 100 |
| (b) Filler | 50–200 |
| (c) Incompatible resin of the groups consisting of alkyl phenolics and non-reactive phenol-formaldehyde resins | 5–30 |
| (d) Plasticizer | 0–50 |
| (e) Solvent having a solubility parameter between 7.5 and 9.2 (cal./cm.$^3$)$^{1/2}$ | 0–1500 |

9. A coating composition comprising:

|  | Parts by weight |
|---|---|
| (a) Polymer according to claim 1 | 100 |
| (b) Filler | 25–150 |
| (c) Tackifying resin of the group consisting of copolymers of 1,3 pentadiene and 2-methyl-2-butene, pentaerythritol esters of rosin, alpha-pinene resins, polyterpene phenolics and olefinic resins | 25–100 |
| (d) Plasticizer | 0–50 |
| (e) Solvent having a solubility parameter between 7.5 and 9.2 (cal./cm.$^3$)$^{1/2}$ | 0–1500 |

References Cited

UNITED STATES PATENTS

| 3,325,430 | 6/1967 | Grasley | 260—846 |
| 3,595,942 | 7/1971 | Wald et al. | 260—879 |
| 3,700,633 | 10/1972 | Wald et al. | 260—94.7 H |

FOREIGN PATENTS

| 3,528 | 12/1970 | Republic of South Africa | 260—880 B |

MORRIS LIEBMAN, Primary Examiner

H. H. FLETCHER, Assistant Examiner

U.S. Cl. X.R.

260—32.8 A, 33.6 A, 33.6 AQ, 33.8 UA 41.5 R, 41.5 A, 94.7 H, 846, 880 B, 887